United States Patent [19]

Nakamura

[11] Patent Number: 4,903,306
[45] Date of Patent: Feb. 20, 1990

[54] VOICE RECOGNITION USING AN EIGENVECTOR

[75] Inventor: Shogo Nakamura, Matsudo, Japan

[73] Assignee: Ricoh Company, Ltd., Japan

[21] Appl. No.: 102,559

[22] Filed: Sep. 29, 1987

[30] Foreign Application Priority Data

Oct. 3, 1986 [JP] Japan ................................ 61-236900

[51] Int. Cl.$^4$ ................................................ G10L 7/08
[52] U.S. Cl. .......................................... 381/42; 381/43
[58] Field of Search ........................ 381/42, 41, 43–45; 364/513.5

[56] References Cited

U.S. PATENT DOCUMENTS

| | | |
|---|---|---|
| 4,363,102 | 12/1982 | Holmgren et al. ..................... 381/42 |
| 4,403,114 | 9/1983 | Sakoe .................................... 381/42 |
| 4,715,004 | 12/1987 | Kabasawa et al. .................... 381/43 |
| 4,720,863 | 1/1988 | Li et al. ................................. 381/42 |
| 4,752,957 | 6/1988 | Maeda ................................... 381/42 |

Primary Examiner—Gary V. Harkcom
Assistant Examiner—John A. Merecki
Attorney, Agent, or Firm—Mason, Fenwick & Lawrence

[57] ABSTRACT

A voice pattern in the form of a matrix and comprised of a plurality of frames, each including time-spectral information and temporal information, is formed from an unknown input voice signal. The voice pattern is compared with each of the voice patterns of a library of known voices partly to select a plurality of candidate voices. Each of the library voices has a predetermined eigenvector and an inner product frequency distribution of inner products between the eigenvector and the frames of its voice pattern. Then, inner products between the voice pattern of the input voice signal and the eigenvector of each of the candidate library voice are calculated. One of the plurality of candidate library voices whose predetermined inner product frequency distribution is most similar to one of the thus calculated inner product frequency distributions is selected to identify the input voice signal.

4 Claims, 3 Drawing Sheets

Fig. 2

WORD NAME = SHITA 34

```
0 0 2 0 0 0|0 0 0
0 0 2 0 0 0|0 0 0
0 0 2 0 0 0|0 0 0
0 0 3 0 0 0|0 0 0
0 0 3 0 0 0|0 0 0
0 0 3 0 0 0|0 0 0
0 0 3 0 0 0|0 0 0
0 0 3 0 0 0|0 0 0
0 0 3 0 0 0|0 0 0
0 0 0 2 0 0|0 0 0
0 0 0 2 0 0|0 0 0
0 0 0 2 0 0|0 0 0
0 0 0 2 0 0|0 0 0
0 0 0 2 0 0|0 0 0
1 0 0 0 0 0|0 0 0
0 1 0 0 0 0|0 0 1
1 1 0 0 0 0|0 0 1
0 1 0 0 0 0|0 0 1
0 1 0 0 0 0|0 0 1
0 1 0 0 0 0|0 0 1
0 2 0 0 0 4|0 0 1
0 2 0 0 0 4|0 0 1
0 3 0 0 0 5|0 0 1
0 3 0 0 0 5|0 0 1
0 3 0 0 0 5|0 0 1
0 3 0 0 0 5|0 0 1
0 3 0 0 0 5|0 0 1
0 3 0 0 0 5|0 0 1
0 3 0 0 0 5|0 0 1
0 3 0 0 0 5|0 0 1
0 3 0 0 0 5|0 0 1
0 3 0 0 0 5|0 1 0
0 3 0 0 0 5|0 1 0
0 0 0 0 0 2|0 1 0
↑ ↑ ↑ ↑ ↑ ↑  ⌣
A B C D E F  G
```

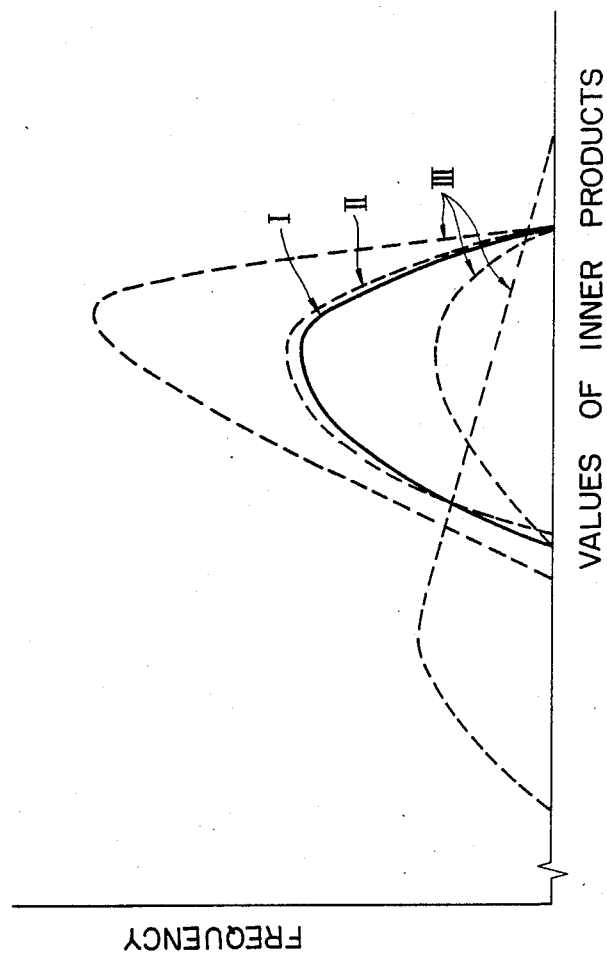

VOICE RECOGNITION USING AN EIGENVECTOR

BACKGROUND OF THE INVENTION

1. Field of the Invention

This invention generally relates to a method and system for recognizing an unknown voice by comparing it with a plurality of known voices, and, in particular, to a method and system for recognizing an unknown input voice utilizing an eigenvector obtained by the principal component analysis method.

2. Description of the Prior Art

There has been proposed a voice recognition method in which a voice produced with a work as a unit is subjected to binary processing to form an input pattern in the form of a time-frequency distribution, which is also called a time-spectral pattern. The input pattern is compared with a plurality of library patterns by linear matching to recognize the input voice. This voice recognition method is also called the BTSP (Binary Time-Spectrum Pattern) method and it is simple and advantageous because it does not use the DP (Dynamic Programming) matching method. In addition, this method is excellent for absorbing frequency fluctuations in TSP so that it is expected to be applicable to an unlimited number of speakers. However, in the conventional BTSP method, a considerably large capacity is required for storing a number of library time-spectral patterns. This requires use of a high-speed processor for carrying out recognition processing without delay.

SUMMARY OF THE INVENTION

In accordance with the present invention, there is provided a method for recognizing an input voice in which a time-spectral pattern having time information and a plurality of frames is obtained from the input voice and the time-spectral pattern is subjected to the principal component analysis method to determine a non-zero eigenvector which is then applied to the time-spectral pattern to determine the distribution of inner products between the eigenvector and the frames of the time-spectral pattern.

It is therefore a primary object of the present invention to obviate the disadvantages of the prior art as described above and to provide an improved method and system for recognizing an unknown input voice.

Another object of the present invention is to provide a voice recognition method and system which is simple in structure and which requires a minimum library storage capacity for library data.

A further object of the present invention is to provide an improved voice recognition method which is fast in operation and easy to implement.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic illustration showing one example of a voice pattern applicable to the present invention; and FIG. 3 is a graph showing an inner product frequency distribution between a library pattern I and several input patterns II and III.

DESCRIPTION OF THE PREFERRED EMBODIMENTS

Figure 1:
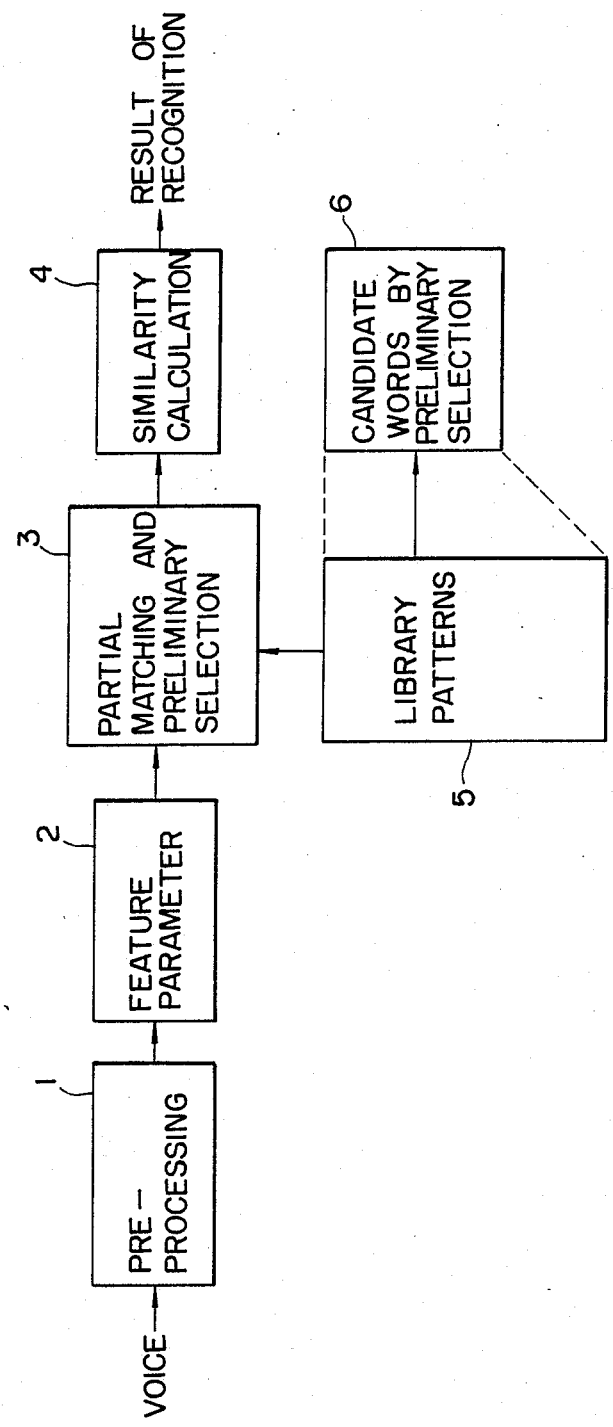
FIG. 1 is a block diagram showing a voice recognition system constructed in accordance with one embodiment of the present invention.

Referring first to FIG. 2, there is shown a voice pattern for the word "shita", which, when pronounced in the Japanese sound, means "down" in English. Such a voice pattern may be formed by sampling a voice signal at a predetermined time interval, for example 10 msec., at a plurality of predetermined frequency bands, for example, by band-pass filters and quantizing the local peak values in each collection of sampled data. The data may be converted to a binary value, for example, by applying a technique disclosed in the U.S. Pat. No. 4,634,966 issued to the inventors of the present application on Jan. 6, 1987.

As shown in FIG. 2, the voice pattern is in the form of a matrix having nine columns and 34 rows. Each row, which is called a frame includes the data obtained by sampling at a particular sampling time period. In other words, when an input voice is sampled at a predetermined time interval at a plurality of predetermined frequency bands which are different from each other, a time frequency distribution is obtained, and, such a time frequency distribution may be processed to define the voice pattern shown in FIG. 2.

In the particular voice pattern shown in FIG. 2, the left three columns A though C define combined frequency information. That is, column A includes combined data for a low frequency region, column B includes combined data for an intermediate frequency region, and column C includes combined data for a high frequency region. In other words, the frequency analyzed data obtained from a plurality of band-pass filters at a predetermined time interval are combined at three frequency regions: low, intermediate and high and, these combined data are placed in the respective low, intermediate and high frequency columns. Column D includes data indicating a voiceless interval, and columns E and F includes low and high frequency emphasized data which have been obtained by processing the frequency analyzed data in a predetermined manner well known to those skilled in the art.

Importantly, the voice pattern shown in FIG. 2 includes three columns indicated by G, which include three binary numbers indicating a B.C.D. code indicating time. For example, the first fifteen frames have "000" in the time column G and this indicates that the first fifteen frames have been sampled at a predetermined time interval, e.g., 10 msec, for a first time period of approximately $15 \times 10$ msec $= 150$ msec. The next sixteen frames have "001" in the time column G and this indicates that the next sixteen frames have been sampled at the predetermined time interval, e.g., 10 msec, for the following second time period of approximately $16 \times 10$ msec $= 160$ msec, which is preferably substantially equal to the first time period. In this manner, a plurality of frames are sampled at a predetermined time interval for a predetermined time period which may be set arbitrarily but preferably set substantially larger than the sampling time interval.

Since each frame or row of the voice pattern shown in FIG. 2 has nine elements (the pattern shown in FIG. 2 has nin columns), the voice pattern shown in FIG. 2 may be considered to be comprised of N number of nine dimensional vectors. As will be described in detail later, in accordance with the principle of the present invention, the voice pattern in the matrix form shown in FIG. 2 is subjected to the well-known principal component analysis to determine a non-zero minimum eigenvector, which is an eigenvector having a non-zero, minimum eigenvalue and, then, inner products between the thus obtained eigenvector and the frames of the voice pattern of FIG. 2 are calculated. The resulting inner products are plotted in a frequency distribution at a plurality (e.g., eight) of intervals different in value from one another to thereby define a histogram of the inner products. This histogram of inner products is used as an identifier of a particular voice.

Referring now to FIG. 1, there is shown in block form a voice recognition system constructed in accordance with one embodiment of the present invention. As shown, the illustrated voice recognition system includes a preprocessing unit 1 into which a voice signal converted from a voice pronounced by a speaker, for example, by a microphone is input. The preprocessing unit 1, for example, includes a voice interval detector in which the power level of the voice signal is monitored to determine a voice interval using a threshold level. Typically, the processing unit 1 also includes a filter bank comprised of a plurality of band-pass filters which have different frequency ranges from one another. As a result, as the voice signal is processed through the preprocessing unit 1, the voice signal is digitized at a plurality of different frequency ranges. The thus obtained digitized voice data are then supplied to a feature parameter unit 2 where the digitized voice data are processed in a predetermined manner to form a voice pattern, for example, of the form shown in FIG. 2. The voice pattern thus formed is supplied to a partial matching and preliminary selection unit 3 where the voice pattern thus supplied is compared with a plurality of library patterns, each corresponding to a known voice, stored in a memory. In this case, the input voice pattern is partially compared with each of the library patterns, for example a predetermined number of first frames, to select possible candidates from the collection of library patterns, which candidates are transferred to a candidate memory 6. Thereafter, the input voice pattern is compared in full with each of the candidate words by calculating a degree of similarity in a similarity calculation unit 4, and the candidate word having the highest degree of similarity is output as a recognized result.

In a preferred embodiment of the present invention, a voice signal is subjected to frequency analysis to produce a time-frequency or time-spectral distribution, and local peaks, which may be considered as the formant, are extracted and used as features of the voice signal. The matching process is preferably carried out in two steps. That is, in the first matching step, the input voice pattern is compared with each of the plurality of library patterns for a predetermined number, e.g., 20, of frames from the first frame in the respective time-frequency distribution patterns while paying attention to the location of local peaks. A predetermined number, e.g., 20, of those library voice patterns having their local peaks more closely located to that of the input voice pattern are selected as possible candidates and transferred to the candidate memory 6. Then, in the second matching step, the input voice pattern is now fully compared with each of the thus selected candidate library voice patterns using the principal component analysis method as will be described in detail below.

The voice pattern of time-spectral distribution shown in FIG. 2 includes a plurality of frames each of which defines a row and can be considered as an element within a vector space. Thus, each frame can be represented as a point Xi in the nine dimensional vector space, which is defined by the following expression.

$$Xi = (Xi_1, Xi_2, \ldots, Xi_9) \tag{1}$$

Here, $i = 1, 2, \ldots, N$. An eigenvector R for one word voice is defined by the following expression. It is to be noted that such an eigenvector can be determined for a voice pattern of the format shown in FIG. 2 for each known voice by applying the principal component analysis.

$$R = (r_1, r_2, \ldots, r_9) \tag{2}$$

Here, $$\sum_{i=1}^{9} r_i^2 = 1.$$

And, an inner product between the eigenvector R and Xi can be defined by the following expression.

$$(R, Xi) = \sum_{j=1}^{9} r_j x_{ij} \tag{3}$$

Now, the inner product calculation of equation (3) is applied to each frame so that there are obtained N number of inner products if the voice pattern has N number of frames. Using the thus obtained inner products, an inner product frequency distribution or histogram of inner products is formed as shown in FIG. 3. This operation is carried out for each of the known voices to define a histogram of inner products obtained as inner products between the eigenvector R and the frames of a voice pattern. The thus obtained histogram of inner products or inner product frequency distribution is stored as a parameter associated with a particular voice. Therefore, if the voice recognition system shown in FIG. 1 has two modes of operation, i.e., registration mode and recognition mode. When the voice recognition system is operated in the registration mode, a known voice is input and its histogram of inner products calculated as described above is produced and stored as a parameter associated with the known voice. In this manner, a plurality of known voices are stored as library data which include the voice pattern and the histogram of inner products. When the voice recognition system is set in the recognition mode, an unknown input voice is compared with each of the library data to determine the identification of the input voice.

DETERMINATION OF EIGENVECTOR R

It is important to determine an eigenvector such that the spread of the distribution of values of inner products is limited so as to limit the memory capacity required to store the inner product frequency distribution. In the first place, an eigenvector is determined so as to minimize the scatter or variance of the inner products (R, Xi). Eigenvalues can be determined by solving a well-known eigenvalue problem for a voice pattern having a matrix format as shown in FIG. 2. Then, among the eigenvalues thus determined, a non-zero and smallest eigenvalue is selected and its corresponding eigenvector is determined for the particular voice pattern. In this manner, since the smallest eigenvalue is selected, the spread of inner product distribution can be minimized. This is advantageous in saving the memory capacity required for storing the data of an inner product frequency distribution. Then, a histogram of inner products is determined and stored in the library 5 together with its eigenvector.

RECOGNITION PROCESSING

In order to identify the unknown input voice, the inner product calculation is carried out between the voice pattern of the input voice as shown in FIG. 2 with the eigenvector of each of the candidate voices which have been selected as a result of the preliminary matching and now stored in the candidate memory 6. Thus, an inner product frequency distribution or histogram of inner products is determined for each of the candidate voices. Then, based on the thus obtained inner product frequency distributions, it is determined which of the candidate voices has the highest degree of similarity. FIG. 3 is a graph showing several inner product frequency distributions with its abscissa indicating the values of inner products and its ordinate indicating the frequency of occurrence. Thus, the graph of FIG. 3 can also be considered to define histograms indicating that inner product values falling within a certain value range occur a certain number of times. Therefore, the abscissa is, in fact, divided into a predetermined number (e.g., 8) of ranges, and thus each distribution is not a continuous distribution, but rather defines a histogram.

In FIG. 3, the solid line curve I indicates an inner product frequency distribution for a particular library voice and the dotted line curve II indicates an inner product frequency distribution for an unknown input voice which corresponds to the particular library voice. Since distributions I and II are for the same sound, these distributions are almost identical and thus placed substantially one on top of the other. On the other hand, the other three dotted line distributions III indicate inner product frequency distributions obtained for different voices. In this manner, if the unknown input voice differs from the library voice, the inner product frequency distribution radically differs in height or lateral spread. Thus, by calculating the degree of similarity in the inner product frequency distribution between input and library voices, the identity of the input voice can be determined.

As described above, in accordance with the present invention, since an inner product frequency distribution and an eigenvector are used as parameters to identify a particular library voice, the memory capacity required to store library voice data can be reduced significantly. Thus, for a given memory capacity, an increased amount of library voice data can be stored. In particular, in the BTSP system where a voice pattern in the form of a time-spectral distribution is binary-valued, the calculation of inner products can be carried out only by addition, which is particularly advantageous. In addition, in accordance with the present invention, the memory capacity required for one library voice is approximately 20 bytes and the arithmetics involved in voice recognition processing are simplified and mostly additions, so that, for a library of approximately 50 word voices, voice recognition can be carried out sufficiently with a general purpose 8-bit microprocessor. It is to be noted that a voice pattern usable in the present invention should not be limited to the one shown in FIG. 2. A voice pattern including frames each having frequency information and time information can be used in the present invention. For example, the columns A through F can contain data which is part of a time-spectral distribution obtained by subjecting a voice signal to frequency analysis.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A voice recognition method including the steps of:
  (a) forming an input voice pattern from an input voice signal of an unknown input voice, said input voice pattern including a plurality of frames, each frame having frequency and time data;
  (b) comparing less than all of said frequency and time data of said input voice pattern with a library of known voice patterns, each of said known voice patterns having its own frequency and time data, to select a plurality of candidate voice patterns, each of said candidate voice patterns having:
    (1) an eigenvector having a non-zero minimum eigenvalue; and
    (2) an inner product frequency distribution of inner products between (i) the frames of each of said candidate voice patterns and (ii) said eigenvector;
  (c) calculating an inner product frequency distribution of inner products between the frames of said input voice pattern and the eigenvector of each of said plurality of candidate voice patterns; and
  (d) selecting one of said plurality of candidate voice patterns, whose inner product frequency distribution is most similar to one of said calculated inner product frequency distributions calculated at said calculating step to thereby identify said input voice by the thus selected candidate voice pattern.

2. The method of claim 1, wherein said input voice pattern has a matrix form comprised of a first predetermined number of rows and a second predetermined number of columns, wherein each of said first predetermined number of rows constitutes a frame.

3. The method of claim 1, wherein said step of comparing is carried out by comparing a predetermined number of first frames of said input voice pattern with corresponding first frames of each of said library voice patterns.

4. The method of claim 1, wherein each of said voice patterns in said library is comprised of data constituting one word.

* * * * *